United States Patent
Comisky et al.

(10) Patent No.: US 6,622,181 B1
(45) Date of Patent: Sep. 16, 2003

(54) TIMING WINDOW ELIMINATION IN SELF-MODIFYING DIRECT MEMORY ACCESS PROCESSORS

(75) Inventors: David A. Comisky, Plano, TX (US); Sanjive Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 471 days.

(21) Appl. No.: 09/603,469

(22) Filed: Jun. 26, 2000

Related U.S. Application Data

(60) Provisional application No. 60/173,670, filed on Dec. 30, 1999, and provisional application No. 60/144,572, filed on Jul. 15, 1999.

(51) Int. Cl.[7] .......................... G06F 13/28; G06F 13/00
(52) U.S. Cl. ............................ 710/22; 710/23; 710/25; 710/26; 710/28; 710/65; 712/34; 712/36; 712/38
(58) Field of Search .............................. 710/22, 26, 40, 710/65, 23, 25, 28; 712/34, 36, 38; 700/2, 5, 7

(56) References Cited

U.S. PATENT DOCUMENTS

| 5,430,853 | A | * | 7/1995 | Arakawa | 710/22 |
| 6,260,081 | B1 | * | 7/2001 | Magro et al. | 710/22 |
| 6,370,601 | B1 | * | 4/2002 | Baxter | 710/65 |

* cited by examiner

*Primary Examiner*—Jeffrey Gaffin
*Assistant Examiner*—Tammara Peyton
(74) *Attorney, Agent, or Firm*—Robert D. Marshall, Jr.; W. James Brady, III; Frederick J. Telecky, Jr.

(57) ABSTRACT

A direct memory access function for servicing real-time events, ensures that any parameter reloads occur during times when the direct memory access channel is idle and guarantees completion before the channel begins active operation again. The direct memory access channel whose parameters are to be updated is disabled during the update cycle. This ensures that no requests are processed until the new parameters have been written to the direct memory access channel parameters. A second direct memory access channel may be used to reload the data transfer parameters permitting a self-modifying direct memory access function.

6 Claims, 7 Drawing Sheets

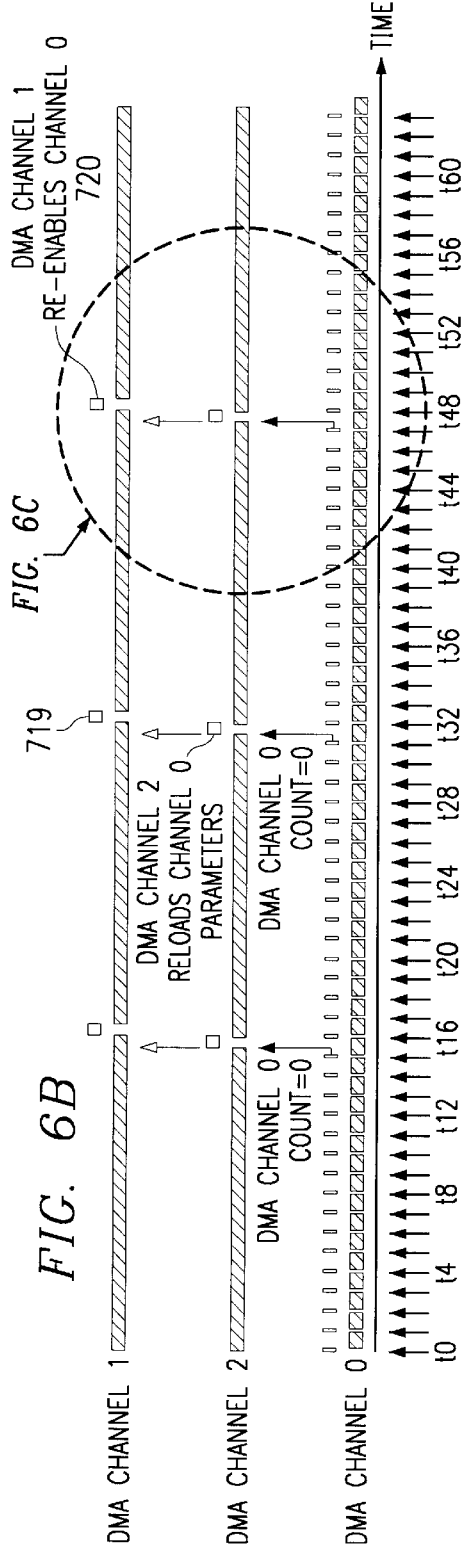
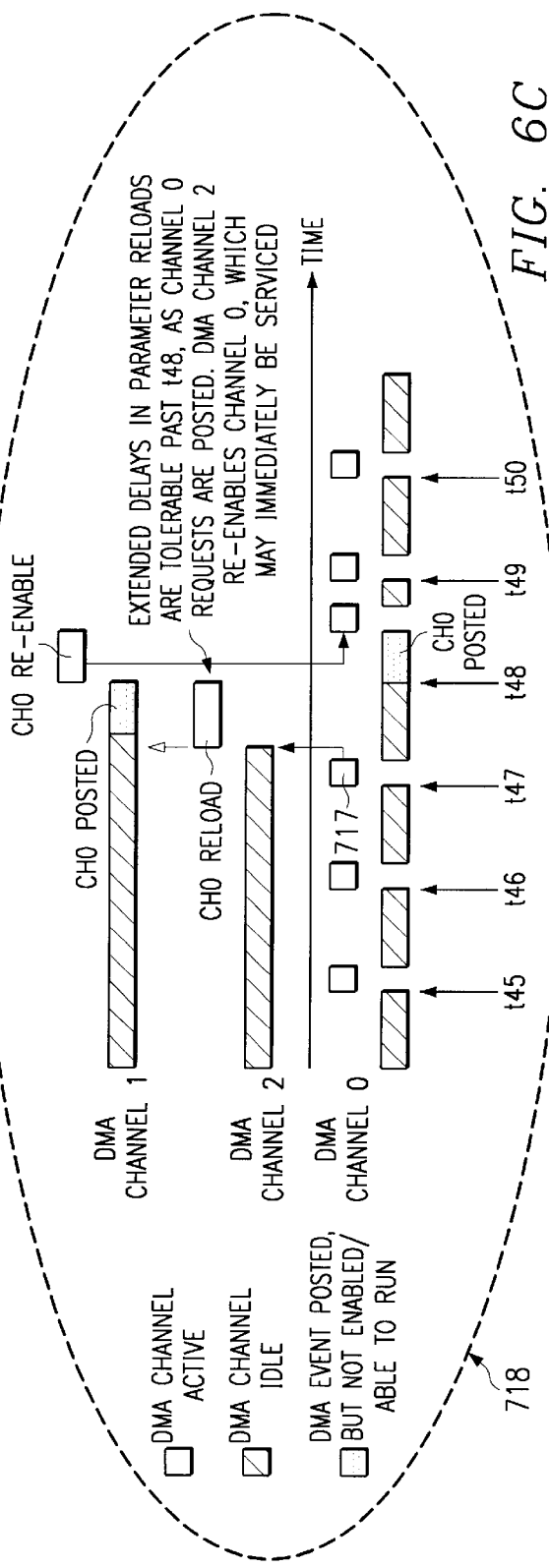
FIG. 6B
FIG. 6C

TIMING WINDOW ELIMINATION IN SELF-MODIFYING DIRECT MEMORY ACCESS PROCESSORS

This application claims priority under 35 USC §119(e)(1) of Provisional Application No. 60/144,572, filed Jul. 15, 1999 and Provisional Application No. 60/173,670, filed Dec. 30, 1999.

TECHNICAL FIELD OF THE INVENTION

The technical field of this invention is digital data processors especially those including direct memory access units which can self-modify their data transfer parameters.

BACKGROUND OF THE INVENTION

In design of microprocessors and particularly digital signal processors (DSP) the need for autonomous data movement via a direct memory access (DMA) controller has become increasingly common. The ability to perform complex data transfers within a memory hierarchy without central processing unit interventions offers substantial system performance benefits by offloading the data movements tasks from the central processing unit. This is particularly helpful for central processing unit which are not natively optimized to control data movement. For example, a digital signal processor might include four to eight parallel functional units, each capable of executing an instruction in a single machine cycle. Of these eight units however, typically only one or two will be capable of controlling memory transfers. Hence, using the central processing unit to perform memory moves is inefficient and degrades system performance. As a consequence, a direct memory access controller becomes a powerful system peripheral.

In order for a direct memory access to be utilized most efficiently, it will generally include one or more channels. A DMA channel generically refers to the context of a memory transaction. Such a context might include the source and destination address of the transaction, a data transfer count, plus any special transfer options that the controller supports. The context of each channel is typically managed by the direct memory access unit and is stored in some storage element. This storage element is typically a RAM or register set. The central processing unit of the system generally has access to these context elements, but will typically access them only for transfer initialization and status monitoring.

FIG. 1 illustrates a channel controller of typical known direct memory access unit. Implementations of direct memory access units may vary widely, but the elementary conventional direct memory access controller channel illustrated in FIG. 1 is suitable for the purpose of explanation. The major task of the direct memory access controller is to generate the source (SRC) address, the destination (DST) address and the transfer count. Register 100 holds the source address which is updated through multiplexer 103 in the run condition and recirculated via path 105 in the case of a stall. Updating the source address consists of addition with a 1 word address increment to the next address location via adder 102. Reload parameters and central processing unit data updates are inserted through multiplexer 104 when auto load or central processing unit write operations are activated.

Similarly register 110 holds the destination address which is updated through multiplexer 113 in the run condition and recirculated via path 115 in the case of a stall. Updating the destination address consists of addition with a 1 word address increment to the next address location via adder 112. Reload parameters and central processing unit data updates are inserted through multiplexer 114 when auto load or central processing unit write operations are activated.

Register 120 holds the data transfer count which is updated through multiplexer 123 in the run condition and recirculated via path 125 in the case of a stall. Updating the data transfer count consists of subtraction with a 1 word address increment to the next transfer count via adder 122. Reload parameters and central processing unit data updates are inserted through multiplexer 124 when auto load or central processing unit write operations are activated. In addition the run/stall signal is generated from a logical combination of channel exhaust condition (zero data transfer count) and the channel request signal generated external to this block.

A common use of a direct memory access engine is for the maintenance of double buffers. In a double buffering scheme, the central processing unit of the system will own one of the buffers, which it uses to process data. The direct memory access will own the other buffer and will write data to or read data from the buffer. The direct memory access unit is typically driven from a real-time system event. For example, in a capture buffer scheme action is as follows.

In direct memory access writes to buffers, the triggering direct memory access event might be a "ready" signal from an analog-to-digital (A/D) converter, which tells the direct memory access unit that a sample is ready and should be read from the analog-to-digital converter and placed into memory. Each event from the analog-to-digital converter to the direct memory access unit tells the direct memory access unit to move one data word corresponding to an analog sample from the source in the analog-to-digital converter to a destination in one of the double buffers. The direct memory access unit performs this transaction and typically also updates the destination address so that the next sample will be written to the next sequential destination address. Note that decrementing destination addresses and indexed addressing modes are also common. The direct memory access unit will also decrement the data transfer count, so that the end of the data transfer can be detected when the data transfer count reaches zero. The event from the analog-to-digital converter to the direct memory access unit will occur many times during the course of filling one of the buffers in a double buffering scheme.

The typical double buffering technique is illustrated in FIG. 2. Analog-to-digital converter 200 supplies a data ready signal to direct memory access controller 201 in response to the source address 203. Direct memory access controller 201 in turn generates the destination addresses for the two banks of capture buffers 204 and 205. The interleaving of the direct memory access read/write activity with direct memory access idle time 206 and analog-to-digital converter data ready signals 207 is shown in the timing diagram.

At some point in time, the buffers must be switched, such so that the central processing unit can process the newly sampled analog-to-digital data. When the buffers are switched, the central processing unit is given access to the buffer that the direct memory access unit formerly owned and the direct memory access unit assumes ownership of the buffer that the central processing unit formerly owned. In order not to lose any data sample, this switch will occur as a result of an interrupt 210 from direct memory access unit 201 to the central processing unit generated upon occurrence of event 211 when the channel data transfer count has reached zero. This indicatives a full buffer. The interrupt informs the central processing unit that the direct memory access unit has filled a new buffer and that the direct memory access unit intends to assume control of the other buffer so that it can continue capturing the real-time data stream from analog-to-digital converter 200.

At this point, it is generally necessary that the direct memory access channel parameters be reloaded, since the transfer count is now zero and the destination address has updated to a value no longer in the range of one of the double buffers. The reload of parameters into the direct memory access channel storage can occur via several methods. Historically, this has occurred as a result of the central processing unit performing a series of accesses to the direct memory access unit storage elements during the interrupt service routine in response to the aforementioned interrupt. This operation is also illustrated at times 212 and 213 in FIG. 2.

While effective in some situations, as the number and complexity of direct memory accesses in a system increase this service requires a greater amount of central processing unit intervention and thus degrades system performance. To combat this performance loss, sophisticated direct memory access controllers will include a facility to perform parameter reloads autonomously at the end of a block transfer. Thus, the central processing unit is only required to set up the channel parameters and reload parameters once during system initialization and is relieved of the direct memory access service activity during active operation. The interrupt from the direct memory access to the central processing unit at the end of a buffer transfer serves only for synchronization between the central processing unit and direct memory access unit 201, informing the central processing unit that new data is available. It is easy to extrapolate a similar buffering scheme for buffers of output data as well.

While effective in many situations, an auto-reload facility within a direct memory access unit can be limited. First, the direct memory access unit may only reload from generally one location and thus the sophistication of supported transfers is limited. Secondly, auto-reload facilities cannot be dynamically updated during active operation without central processing unit intervention which again degrades system performance.

A more generic solution that can be implemented is to allow the direct memory access unit itself memory-mapped access to its own channel parameters. By providing such access, a direct memory access channel can be initialized by itself or by another direct memory access channel. This facility provides greater flexibility than auto-reload facilities, because parameter reloads can occur from any location to which the direct memory access has access. Additionally, reloads can occur at any time, as opposed to the restriction of block boundaries to which auto-reloads are subject. An example of the memory-mapped solution will now be described.

Consider a multi-channel direct memory access. One of the channels is programmed to move real-time analog-to-digital data to memory as described above. The second channel is programmed to copy reload parameters from system memory to the first channels parameter storage elements. In this example, consider that the second channel is triggered by the end-of-block condition of the first channel. When the block is completed in the first channel, the second channel starts up and reloads the parameters for the first channel by reading them from system memory and writing them directly to the first channel parameter storage elements. These new parameters may point to a different buffer and thus the same function as the aforementioned double-buffering scheme can be replicated.

The advantage of this technique over the auto-reload technique is that the updated parameters are stored in system memory. Thus the central processing unit may access these parameters more quickly than it can access the direct memory access unit registers. Additionally, having the parameters updated from any memory allows much greater flexibility than limiting reload from a fixed location. For example, the second direct memory access channel may be able to walk through a set of reload parameters in memory as opposed to always copying from the same set. This allows the central processing unit the ability to set up a linked list of transfer parameters which the first channel will perform. This would not be possible with the simple auto-reload facility.

An example of this operation is illustrated in 300 of FIG. 3. Channel 0 having a data transfer count of zero is the condition activating a request event for channel N. Channel N responds by copying reload parameters from system memory to the address and data transfer count registers of channel 0. Many elaborate schemes are possible using this method, such as circular buffering, scatter-gather operations, data pooling, and self-modifying direct memory accesses.

It is clearly possible to provide the above advantages using only the central processing unit to perform the direct memory access channel parameter updates. However, this once again degrades system performance. By allowing the direct memory access unit access to its own registers, parameter updates can be performed autonomously. It is important to realize however either the central processing unit update method or the direct memory access updates method provides more flexibility than is possible with simple auto-reload from a fixed location.

The reload of parameters into a direct memory access unit has certain limitations. Since direct memory access is commonly used for servicing real-time events, care must be taken to ensure that parameter reloads occur during times when the direct memory access channel is idle. This reload must be guaranteed to complete before the channel begins active operation again. Failure to meet these requirements may result in lost or corrupted data streams which can cause the system to fail. Note this issue occurs because of the asynchronous operation of the central processing unit and the direct memory access unit. Because the central processing unit and the direct memory access channels operate in relative seclusion from one another, accesses to the channel parameters of a direct memory access unit must be carefully timed to occur during the aforementioned windows. This is often difficult to control, since the central processing unit or the reloading direct memory access channel may be busy performing other operations when a channel is ready to be reloaded. In the case of simple auto-reload, this is generally not an issue because the auto-loads is performed almost immediately.

FIG. 4 illustrates a classic timing window. Consider once again a direct memory access channel servicing a real-time data stream from an analog to digital converter. At the end of a complete buffer, the buffers must be ping-ponged and the central processing unit notified that new data is ready. Additionally, the direct memory access parameters must be reloaded to point to the other buffer. While the parameter updates are performed the analog to digital converter knows nothing of this and will continue to capture data and request service by the direct memory access unit. If a request is serviced by the direct memory access unit before the parameter updates have occurred, then data will be written to an invalid location potentially corrupting other system memory. Thus, the time between the last direct memory access transfer to one buffer and the first transfer to the next buffer is a critical timing window. The parameter updates must be guaranteed to occur during this timing window. At times t116 and t32 the channel 0 data transfer count 0 condition is active. The focus here is on the time instant t47 447 at which critical timing window 450 begins. During this timing window 450, parameter updates must occur. Any updates occurring after the critical window 450 ends at time instant t48 will result in analog to digital converter data A2D being written to the wrong memory location.

Whether the direct memory access parameter updates occur via central processing unit access or using the memory-mapped direct memory access method, a reliable method of preventing the corruption of data streams or system memory must be provided. Traditionally, this has been achieved by the central processing unit disabling a direct memory access channel while it is reloaded, performing the parameter updates, and then re-enabling the direct memory access channel. This method can also be applied to the memory-mapped direct memory access unit access method. However, it costs more in terms of additional parameter storage required solely for the purposes of eliminating the timing window as compared to the storage costs of simply moving actual data in the system.

SUMMARY OF THE INVENTION

Because the direct memory access function of a digital signal processor is commonly used for servicing real-time events, care must be taken to ensure that any parameter reloads occur during times when the direct memory access channel is idle and must be guaranteed to complete before the channel begins active operation again. Failure to meet these requirements may result in lost or corrupted data streams, which can cause the system to fail. Accesses to the channel parameters of a direct memory access unit must be carefully timed to occur during well-defined timing windows or the timing window must be made non-critical or eliminated. Four direct memory access support features are described which allow for implementation of the solution of this invention. These are: request posting; parameter exhaustion; channel enable/disable; and parameter access.

To eliminate the timing window, it is necessary to disable the direct memory access channel whose parameters are to be updated during the update cycle. This ensures that no requests are processed until the new parameters have been written to the direct memory access unit channel parameters. The proposed method for timing window elimination in direct memory access units represents an efficient and elegant solution to this common direct memory access problem.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
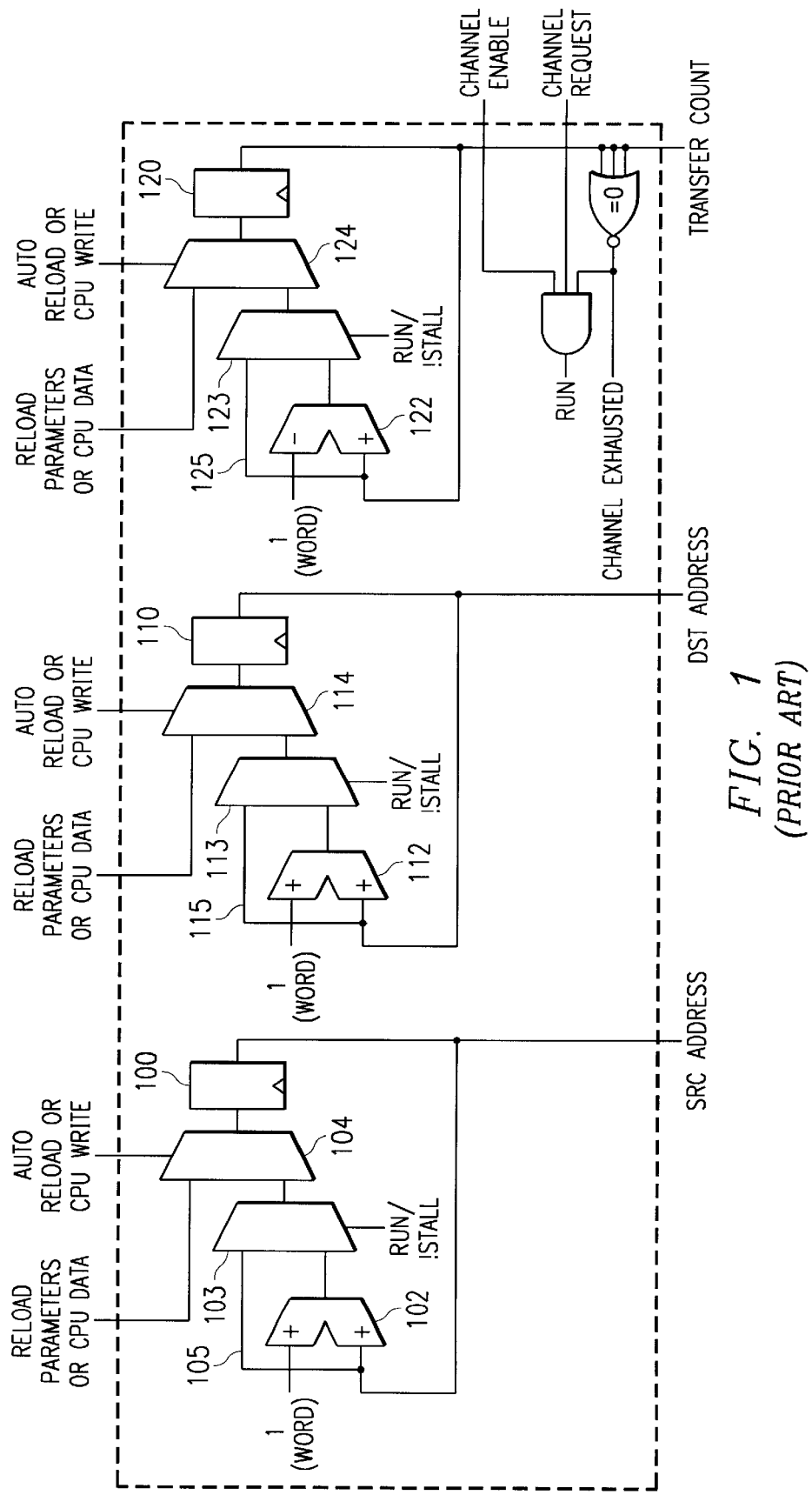
FIG. 1 illustrates a prior art generic elementary direct memory access unit.
Figure 2:
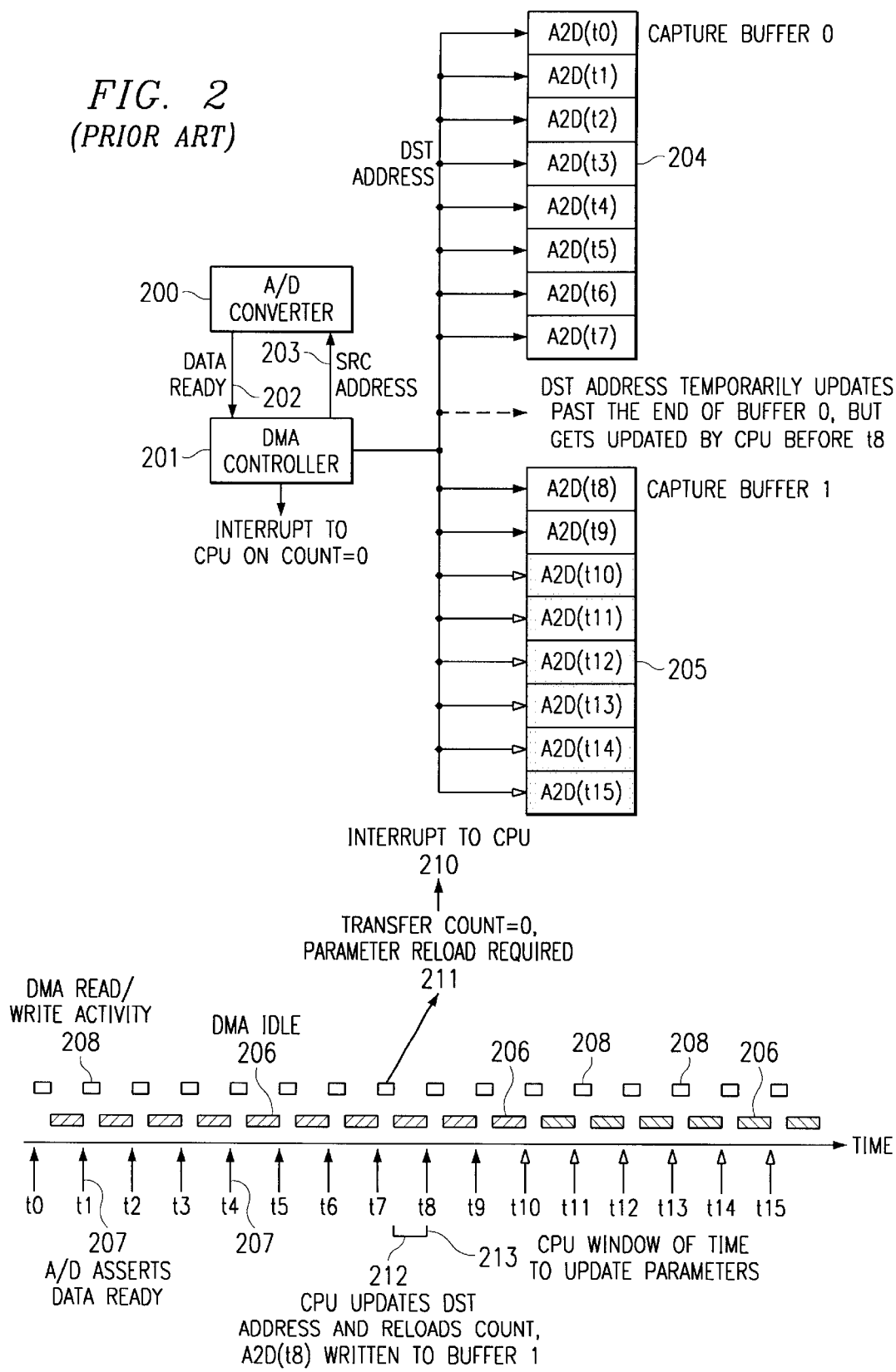
FIG. 2 illustrates a typical prior art double buffer using the events from an analog to digital converter to the direct memory access unit filling one of the buffers in a double buffering scheme and the direct memory access/central processing unit interaction.
Figure 3:
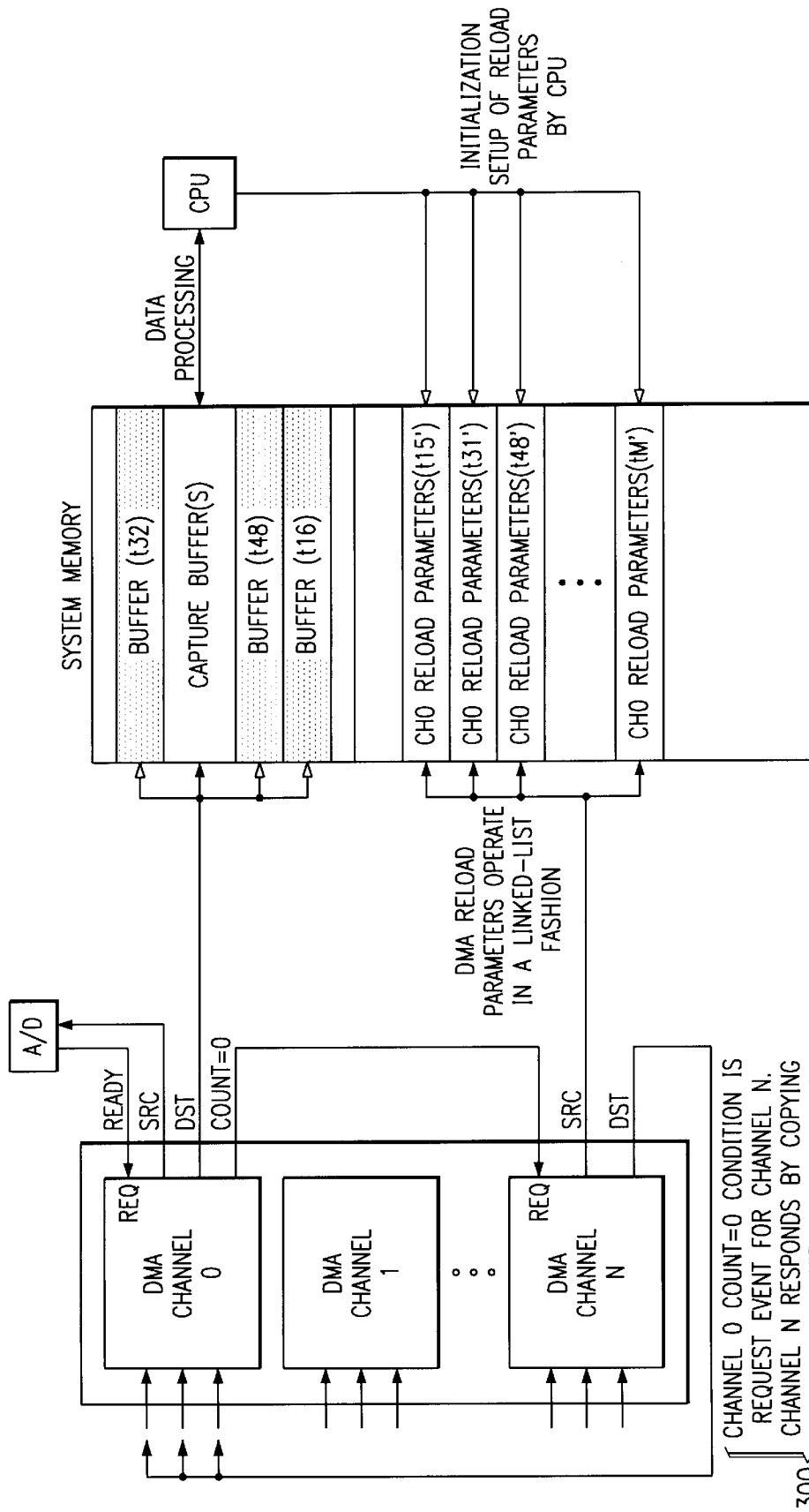
FIG. 3 illustrates a typical prior art direct memory access unit reload facility with a linked-list.
Figure 4:
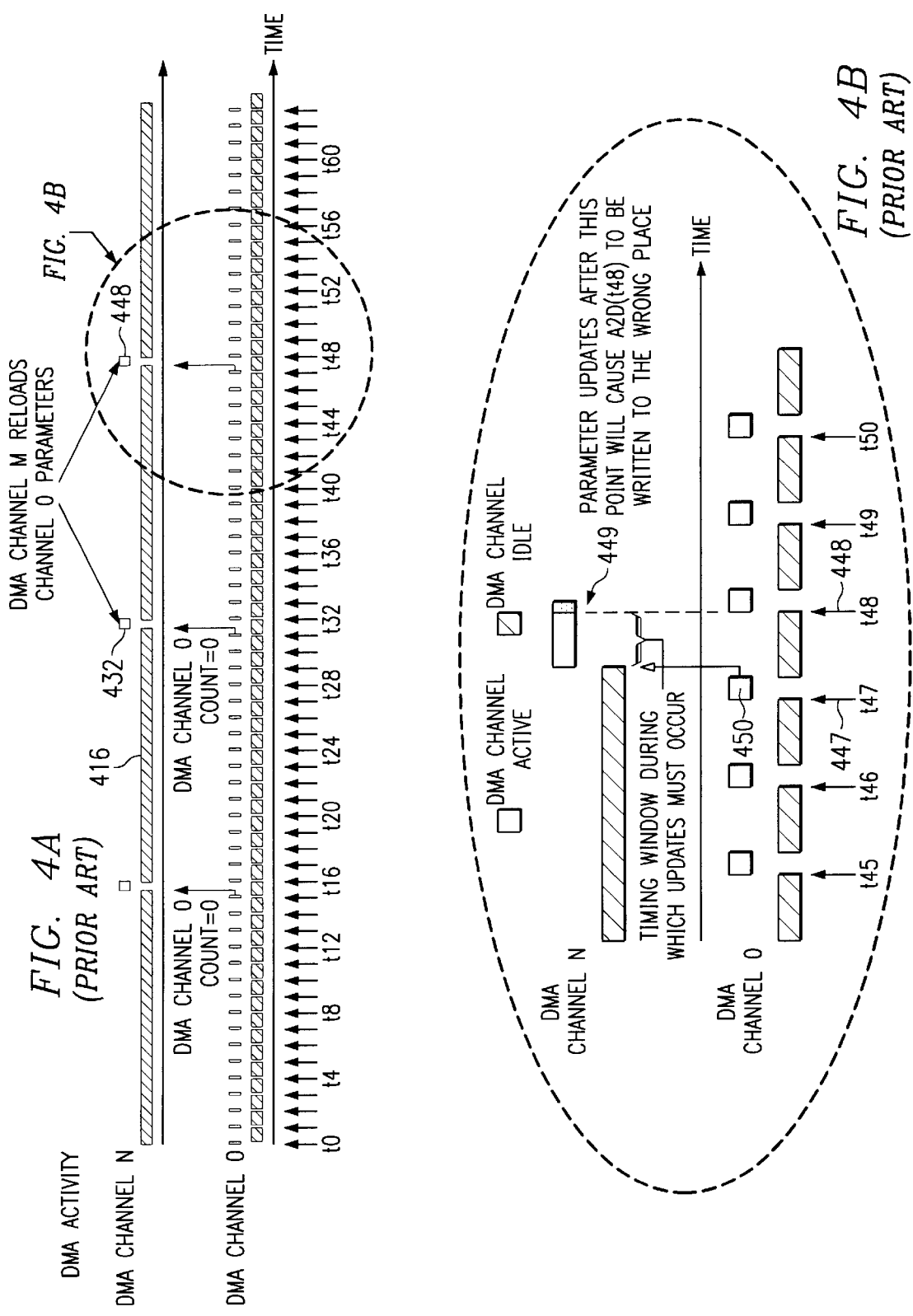
FIG. 4 illustrates the critical timing window between the last direct memory access transfer to one buffer and the first transfer to the next buffer of the prior art.

The generic timing window described above can be eliminated with a simple hardware facility along with some initial setup of direct memory access parameters. The four elements of the solution lie in providing the following support features in the direct memory access: request posting; parameter exhaustion; channel enable/disable; and parameter access. These support features will now be described.

The first element to the solution of this invention is support for posted transfers to the direct memory access controller. If a direct memory access request is posted to the direct memory access unit, the request must be latched within the direct memory access unit and remain as a pending request until the direct memory access unit services it. This should occur regardless of whether or not the direct memory access channel is enabled to service the event. Note this is analogous to a microprocessor interrupt or pending/interrupt enable register architecture. If an interrupt is pending but not enabled in a central processing unit, no interrupt service routine is executed but the interrupt remains pending. If enabled, the interrupt will then immediately be taken. The same is true of this facility for the direct memory access. If service is requested of a channel and is pending, when the direct memory access channel is enabled, service will begin very shortly afterwards. Service might begin, as an example after possible arbitration phases, etc.

Note that depending on the system architecture, the support for posted transfers may in fact be incorporated into the device or module requesting service, as opposed to the direct memory access unit. For example, if level-sensitive requests are input to a direct memory access unit, then the request will by definition remain posted until it is serviced by the direct memory access unit. Thus no latching of requests is necessary in the direct memory access unit. It is noted however that as direct memory access unit and system speeds increase, the trend is to move towards edge-sensitive requests. This is due to the latencies which may be incurred in response to an event, as well as the pipelining of events and servicing. Such pipelining and servicing is typically added for performance reasons. For example, if a request is posted to a direct memory access unit using a level-sensitive input which is not de-asserted until the transfer completes, the direct memory access unit may falsely sample the request input again and attempt a second access. With edge sensitive triggering this is not an issue, since only one edge transition was signaled. When edge-sensitive triggering is used, the requests are generally latched within the direct memory access unit as described above. In either case however, it is important that the direct memory access unit or system supports request posting to the direct memory access unit, because the second part of this solution relies on a temporary disabling of the direct memory access channel. To eliminate the timing window, it is necessary to disable the direct memory access channel whose parameters are to be updated during the update cycle. This ensures that no requests are processed until the new parameters have been written to the direct memory access channel parameters. Note that because of the aforementioned request posting facility, any requests made for the direct memory access channel while the updates are being performed will be captured and performed once the updates are complete and the channel re-enabled. A side benefit of disabling the direct memory access channel is that the time allowed for updates to be performed has been increased by up to a complete request period.

The next function required in this invention is that the direct memory access unit must detect the condition when the direct memory access channel parameters have been exhausted. To provide this feature, the direct memory access unit will typically implement a simple compare function on the data transfer count parameter. In the case of multi-dimensional direct memory accesses, multiple counters may need to be compared. In any case, the exhaustion signal indicates that the parameters of a channel have been completely processed and it is necessary to reload the direct memory access channel with new parameters. Note that in the case of an auto-reload direct memory access, this condition would force the auto-reload to occur directly.

Figure 5:
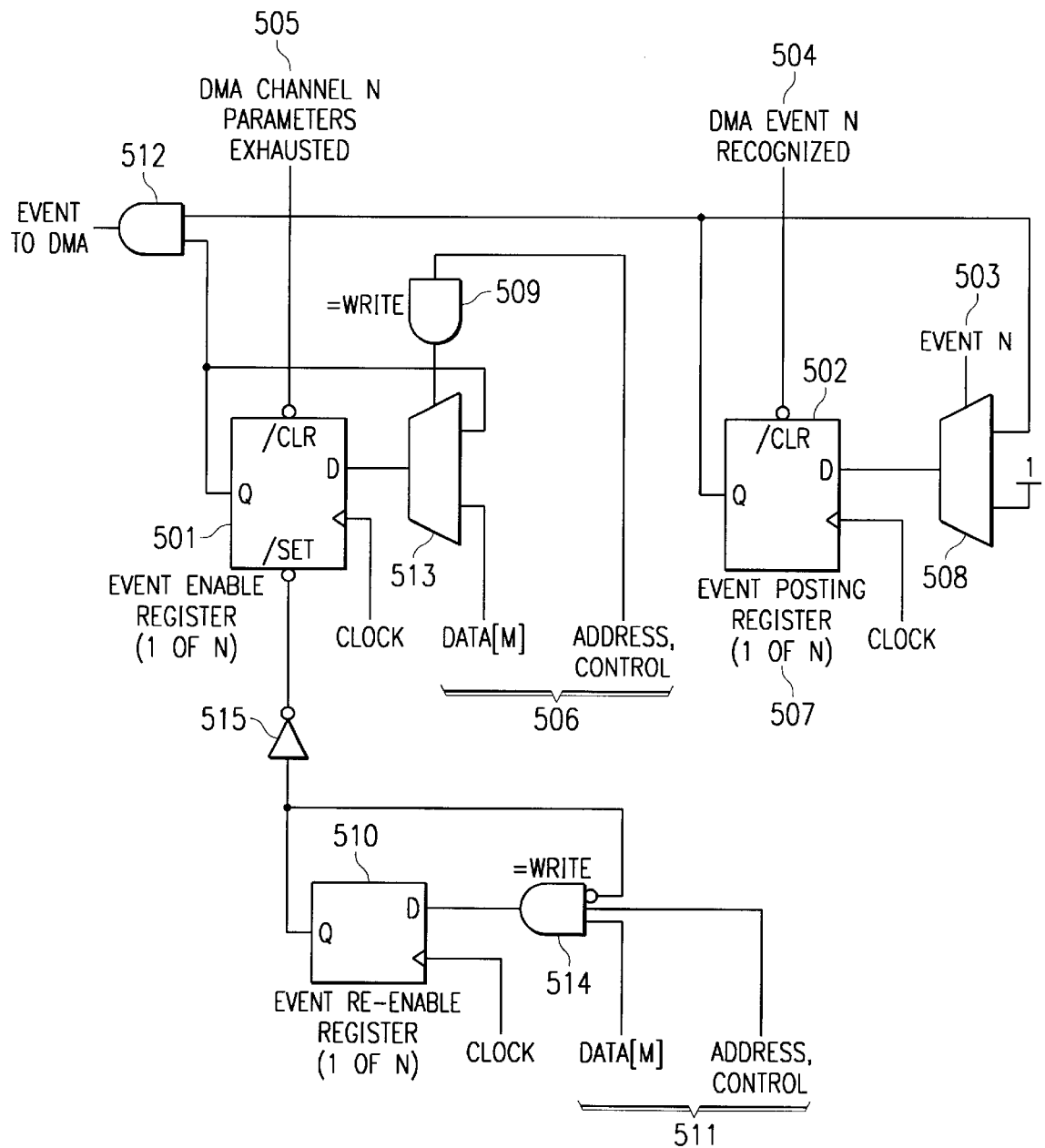
FIG. 5 illustrates a direct memory access channel event capture and posting register for posting the memory mapped control register re-enable feature provided either via a separate register for each channel, or via a level sensitive write function and re-enabling the direct memory access channel.

FIG. 5 illustrates this disable function. In this invention the exhaustion detect signal is used to disable the corresponding direct memory access channel from servicing any requests until the channel is re-enabled. The condition of channel N parameters being exhausted 505 results in a clear of a corresponding bit of register 501 which in turn gates off any events being signaled to the direct memory access unit at output 512. Any requests that are posted during the time that the channel is disabled will be captured in the aforementioned request posting facility. The bit of register 501 may be written to if address and control signals 506 match the criteria of AND gate 509. If there is not match at AND gate 509, then multiplexer 513 recirculates the Q output, thus maintaining the prior state. If AND gate 509 switches, then multiplexer 513 selects the data signal for writing into the bit of register 501.

FIG. 5 illustrates event posting 507 via one bit of register 502. The corresponding event signal 503 controls the selection made by multiplexer 508. When event signal 503 is inactive, multiplexer 508 recycles the Q output of bit 502 retaining its current state. A momentary switching of event 503 to indicate receipt of an event causes multiplexer 508 to select the 1 input. This sets bit 502. When event signal 503 returns to inactive, multiplexer 508 retains the state of bit 502 by recirculation of the Q output. Bit 502 is cleared upon receipt of an active event N recognized signal 504. Recirculation of the Q output via multiplexer 508 retains the cleared state until the next active event signal 503.

The channel disable feature is provided as an autonomous feature and distinguishes this solution from others that rely on intervention from a system central processing unit or other intelligent peripheral. The exhaustion condition for each direct memory access channel should also be provided as a direct memory access output in some form. This allows the exhaustion condition of one channel to become the request input for another channel. This will be used to reload the direct memory access channel that has been exhausted.

FIG. 5 also illustrates an example of the re-enabling of the direct memory access channel. This is the third aspect of the solution of this invention by which the direct memory access channel may be re-enabled via a memory-mapped access. The direct memory access unit itself should be provided such access, such that this solution may be performed solely by the direct memory access without any central processing unit intervention. Central processing unit access to this facility however might not be precluded.

The channel re-enable facility can generally be provided via a simple memory-mapped control register 510 within the direct memory access. While a typical control register 510 might include enable/disable bits for each of the direct memory access channels, it is important that the implementation follow a few simple guidelines. To provide simple interfacing with the direct memory access unit which will actually perform the register access, it is desirable that the memory mapped control register 510 re-enable feature be provided either via a separate register for each channel, or via a level sensitive write function. Using a separate register for each channel enable/disable bit is effective and desirable because it allows a direct memory access to re-enable/disable another direct memory access channel without affecting any of the other channels. Because of the large amount of address decode that may result from such an implementation however, a more common and elegant solution is to provide a simple channel re-enable register 510 as illustrated FIG. 5. This register is affected only by writes of a logical "1" or a logical "0" but not both.

In such an implementation, for example, a channel can be re-enabled by writing to the direct memory access re-enable register 510 with a logical "1" (or a logical "0" ) on all bits corresponding to the channel which is to be re-enabled. Writing a "0" (or "1") to other bits in the direct memory access re-enable register has no effect. In systems that include a direct memory access re-enable register such as this, it is also proposed that a similar channel disable register be provided. In the case of a separate register for each direct memory access channel, this is not necessary.

Referring back to FIG. 5, the corresponding direct memory access channel N is re-enabled via a proper write to a bit of register 510. Upon proper match of address and data signals 511 in AND gate 514, data[M] is written into the bit of register 510. In this example only a "1" may be written into the bit of register 510, an attempt to write a "0" will have no effect. This write changes the state of the bit of register 515. This sets the state of the corresponding bit of register 501 via inverter 515. The feedback of the Q output via the inverting input of AND gate 514 causes AND gate 514 to switch off. The bit of register 510 toggles on the next clock signal due to this feedback. Thus register 510 is effectively a one shot circuit.

The significance of either solution above is that they allow an access to be performed that will affect only one of the direct memory access channels. Since a direct memory access controller typically does not have any data interpretation capabilities, and the initializing central processing unit cannot know the state the direct memory access will be in when the parameter updates are performed, providing this facility is crucial. By providing this feature, it is possible to re-enable a particular direct memory access channel with a pre-calculated data value to be written to the direct memory access re-enable facility. Note that without this feature, such an access could possibly alter the state of other direct memory access channels within the controller, which is undesirable, and could cause system failure.

The final portion of this solution is the facility allowing a direct memory access channel access to another direct memory access channel's parameters. This can vary across implementations, however, is commonly provided via the aforementioned memory-mapped control register access. In most implementations all direct memory access channels are the same and thus all can support this feature. Such orthogonal support greatly enhances the capabilities of this solution.

By providing access to the direct memory access parameters from the direct memory access unit itself, direct memory accesses can be thought of as self-modifying. That is, one direct memory access may modify the parameters of another direct memory access, and in the most exotic cases, even its own parameters to produce various transfer types which the direct memory access unit alone could not support. For example, using self-modifying direct memory accesses it is possible to produce circular buffering schemes with a direct memory access unit on arbitrary address boundaries, whereas the direct memory access might only natively support such transfers on $2^N$ boundaries.

Putting the above four components together, the following solution can be obtained. Consider the case of a direct memory access unit with three channels. One is programmed to service a real time data stream from an analog-to-digital converter and the second is programmed to reload parameters. The central processing unit is responsible for initially setting up the parameters for all direct memory access channels, plus writing the first channel's reload parameters to memory. Additionally, the central processing unit writes a single word to memory for the third direct memory access channel to be used to re-enable the first channel. The second direct memory access channel, which is responsible for updating the parameters of the first direct memory access, will read these parameters from system memory and write them to the reload storage elements of the first channel. The third channel is used to re-enable the first direct memory access event for active operation.

Figure 6A:
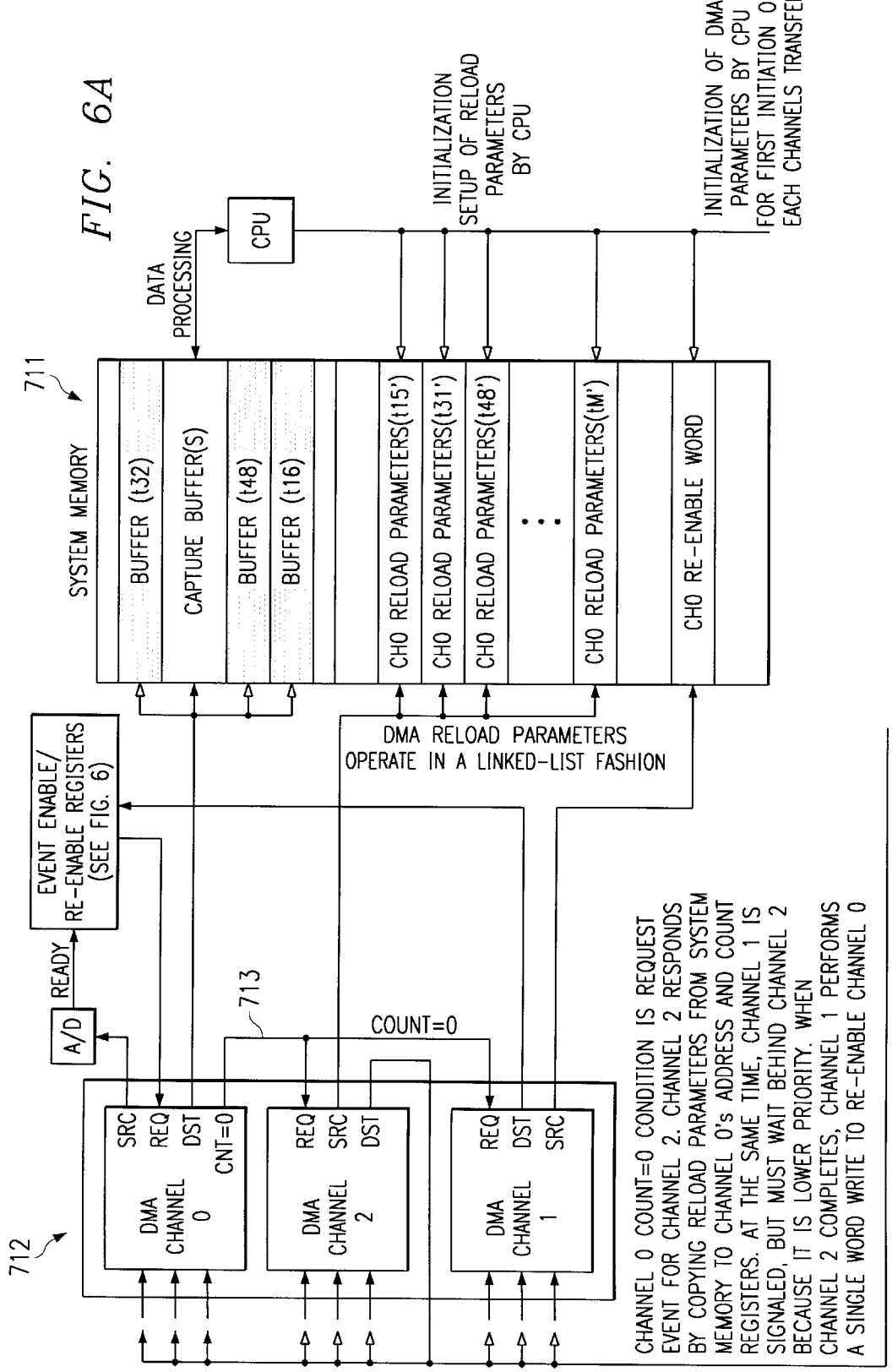
FIG. 6 illustrates the timing window elimination in self-modifying direct memory access units of this invention.

The direct memory access parameter and system configuration is illustrated in FIG. 6. At initialization time, the central processing unit sets up the parameters for both direct memory access channels, plus the reload parameters for the first direct memory access channel in memory 711 (FIG. 6A). The first direct memory access channel is configured to perform a read of the analog-to-digital converter and a write to memory each time the analog-to-digital converter requests service. Using the previously mentioned address and word count updates, this direct memory access channel creates a buffer of data.

At some point, shown after 16 samples t16 through t32 in this example, the first direct memory access channel exhausts its data transfer count. This condition forces this direct memory access channel 712 (FIG. 6A) to automatically disable itself. This condition is also tied back to the request input 713 for the second direct memory access channel. The second direct memory access channel, channel 2 in the example of FIG. 6, is configured during interval 719 to copy parameters from the system memory, which the central processing unit set up at initialization time, to the direct memory access parameters of the first channel (channel 0). The second channel may or may not update its internal addresses and word counts, which could be used to perform reloads in a linked-list fashion as described earlier. For the purposes of outlining the advantages of this solution, it is assumed that a request for channel 0 from the analog-to-digital converter comes in while the second channel is performing its updates shown as sample t48 in FIG. 6B.

When the second channel (channel 2) completes its parameter updates, the third channel (channel 1 in FIG. 6) is requested to perform a single access. This access reads a single word from system memory and writes it to the direct memory access re-enable register. In many implementations, the triggering of the third channel (channel 1) and the second channel (channel 2) will be tied to the same event (the exhaustion of the parameters of the first channel). In such implementations, it is important that the second channel, the one performing the reload of the first, is allowed to complete before access by the third channel. This can normally be easily guaranteed by placing the parameters of the second channel on a higher priority level than those of the third channel.

The above solution requires three direct memory access channels. In many systems, this may prove very costly, as direct memory access channels are generally a limited resource. It is noted that this solution was initially designed for implementations using an external direct memory access controller such as described in U.S. patent application Ser. No. 09/603,332 filed Jun. 25, 2000 entitled EXTERNAL DIRECT MEMORY ACCESS PROCESSOR INTERFACE TO CENTRALIZED TRANSACTION PROCESSOR, claiming priority from U.S. Provision Application No. 60/144,572 filed Jul. 15, 1999 and U.S. Provisional Application No. 60/167,441 filed Nov. 23, 1999. In such an implementation, this solution proves very effective and low cost, as each channel is limited only by the amount of parameter RAM allocated to it without any central processing unit intervention.

The proposed method for timing window elimination using self-modifying direct memory accesses represents an efficient and elegant solution to a common direct memory access problem. This solution has added benefits over previous solutions which required intervention by a system central processing unit.

What is claimed is:

1. A method of eliminating critical timing window requirement in a direct memory access unit comprising the steps of:

receiving and latching any direct memory access requests until serviced by a direct memory access unit;

upon servicing of a direct memory access request recalling data transfer parameters from a predetermined data transfer parameter address, performing a data transfer corresponding to said recalled data transfer parameters and updating said data transfer parameters, said data transfer parameters including a predetermined number data transfers employing a first direct memory access channel;

detecting exhaustion of said predetermined number of data transfers of said data transfer parameters;

upon detection of exhaustion of said predetermined data transfers disabling servicing of said direct memory access requests, thereafter loading new data transfer parameters at said predetermined data transfer parameter address employing a second direct memory access channel to transfer data from a predetermined reload parameter address to said predetermined data transfer parameter address, and thereafter re-enabling servicing of said direct memory access requests.

2. The method of claim 1, wherein said direct memory access unit includes plural direct memory access channels and wherein:

said step of disabling servicing of said direct memory access requests includes setting a first logic state in an event enable register bit; and said step of re-enabling servicing of said direct memory access requests includes setting a second logic state opposite to said first logic state in said event enable register bit by writing predetermined data to a predetermined event enable address employing a third direct memory access channel.

3. The method of claim 1, wherein:

said step of receiving and latching any direct memory access requests includes setting an event posting register bit to a first logic state upon receipt of said direct memory access request and setting said event posting register bit to a second logic state opposite to said first logic state upon servicing said direct memory access request.

4. A method of eliminating critical timing window requirement in a direct memory access unit comprising the steps of:

receiving and latching each of a plurality of types of direct memory access requests until serviced by a direct memory access unit;

upon servicing of a type of direct memory access request recalling data transfer parameters from a predetermined data transfer parameter address corresponding to said type, performing a data transfer corresponding to said recalled data transfer parameters and updating said data transfer parameters, said data transfer parameters including a predetermined number data transfers employing a first direct memory access channel;

detecting exhaustion of said predetermined number of data transfers of said data transfer parameters of each type;

upon detection of exhaustion of said predetermined data transfers of a type of direct memory access request disabling servicing of said type of direct memory access requests, thereafter loading new data transfer parameters at said predetermined data transfer parameter address corresponding to said type employing one of a plurality of second direct memory access channels corresponding to said type to transfer data from a predetermined reload parameter address to said predetermined data transfer parameter address corresponding to said type, and thereafter re-enabling servicing of said direct memory access requests of said type.

5. The method of claim 4, wherein said direct memory access unit includes plural direct memory access channels and wherein:

said step of disabling servicing of said direct memory access requests includes setting a first logic state in an event enable register bit corresponding to said type; and said step of re-enabling servicing of said direct memory access requests includes setting a second logic state opposite to said first logic state in said event enable register bit corresponding to said type by writing predetermined data to a predetermined event enable address corresponding to said type employing a third direct memory access channel corresponding to said type.

6. The method of claim 4, wherein:

said step of receiving and latching a type of said direct memory access requests includes setting an event posting register bit corresponding to said type to a first logic state upon receipt of said direct memory access request and setting said event posting register bit corresponding to said type to a second logic state opposite to said first logic state upon servicing said direct memory access request.

\* \* \* \* \*